(12) United States Patent
Gill

(10) Patent No.: US 7,805,026 B2
(45) Date of Patent: Sep. 28, 2010

(54) RESONATOR-ASSISTED CONTROL OF RADIO-FREQUENCY RESPONSE IN AN OPTICAL MODULATOR

(75) Inventor: Doglas M. Gill, South Orange, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/168,976

(22) Filed: Jul. 8, 2008

(65) Prior Publication Data

US 2009/0092350 A1 Apr. 9, 2009

Related U.S. Application Data

(63) Continuation-in-part of application No. 11/869,205, filed on Oct. 9, 2007.

(51) Int. Cl.
*G02F 1/035* (2006.01)
(52) U.S. Cl. .......................................... 385/2; 359/279
(58) Field of Classification Search .................. 385/1–9, 385/15
See application file for complete search history.

(56) References Cited

U.S. PATENT DOCUMENTS

| 6,389,203 | B1 | | 5/2002 | Jordan et al. | |
| 6,580,532 | B1 | * | 6/2003 | Yao et al. | 398/39 |
| 6,731,922 | B1 | * | 5/2004 | Strutz et al. | 455/302 |
| 6,943,931 | B1 | * | 9/2005 | Dingel | 359/279 |
| 6,993,480 | B1 | * | 1/2006 | Klayman | 704/226 |
| 7,142,309 | B2 | | 11/2006 | Miyazaki et al. | |
| 7,181,093 | B2 | * | 2/2007 | Yap et al. | 385/1 |
| 7,200,299 | B1 | | 4/2007 | Earnshaw | |
| 7,308,160 | B2 | | 12/2007 | Gill et al. | |
| 7,389,053 | B1 | * | 6/2008 | Ilchenko et al. | 398/183 |
| 2003/0175036 | A1 | | 9/2003 | Mamyshev et al. | |

(Continued)

FOREIGN PATENT DOCUMENTS

WO          WO 01/18598 A1          3/2001

(Continued)

OTHER PUBLICATIONS

Amnon Yariv, entitled "Critical Coupling and Its Control in Optical Waveguide-Ring Resonator Systems," published in IEEE Photonics Technology Letters, vol. 14, No. 4, Apr. 2002, pp. 483-485.

(Continued)

*Primary Examiner*—Charlie Peng
*Assistant Examiner*—Peter Radkowski
(74) *Attorney, Agent, or Firm*—Mendelsohn, Drucker & Associates, P.C.

(57) ABSTRACT

In one embodiment, an optical modulator has a Mach-Zehnder interferometer (MZI) and an optical resonator coupled, via a tunable optical coupler, to one of the MZI internal arms. The optical resonator induces in the MZI frequency-dependent optical losses characterized by a comb of spectral resonances. The coupling strength between the optical resonator and the MZI set by the optical coupler controls the magnitude of the loss due to the resonances, while one or more optical phase shifter located in the optical resonator controls the spectral position of the resonances. Either the optical coupler or the optical phase shifter, or both, can be tuned to adjust the modulator's radio-frequency response curve.

20 Claims, 12 Drawing Sheets

U.S. PATENT DOCUMENTS

| | | | |
|---|---|---|---|
| 2003/0235367 A1 | 12/2003 | Yamakazi | |
| 2004/0165893 A1 | 8/2004 | Winzer | |
| 2004/0202395 A1* | 10/2004 | Yap et al. | 385/1 |
| 2006/0045522 A1 | 3/2006 | Gill et al. | |
| 2007/0009205 A1* | 1/2007 | Maleki et al. | 385/27 |

FOREIGN PATENT DOCUMENTS

| | | |
|---|---|---|
| WO | WO 2007/074485 A1 | 7/2007 |
| WO | 2009/048572 A1 | 4/2009 |

OTHER PUBLICATIONS

Xiaobo Xie et al., entitled "Linearized Mach-Zehnder Intensity Modulator," IEEE Photonics Technology Letters, vol. 15, No. 4, Apr. 2003, pp. 531-533.

Hidenori Takahashi et al., entitled "Analysis of Negative Group Delay Response of All-Pass Ring Resonator With Mach-Zehnder Interferometer," IEEE Photonics Technology Letters, vol. 16, No. 9, Sep. 2004, pp. 2063-2065.

Jianyi Yang, entitled "Influence of Loss on Linearity Of Microring-Assisted Mach-Zehnder Modulator," Optics Express, vol. 12, No. 18, Sep. 6, 2004, pp. 4178-4188.

Douglas M. Gill et al., entitled "Semiconductor Optical Modulator," U.S. Appl. No. 11/684,625, filed Mar. 11, 2007, (26 pages).

G. Lenz, et al., "Optical Delay Lines Based on Optical Filters" IEEE Journal of Quantum Electronics, 2001, vol. 37, No. 4, pp. 525-532.

C.K. Madsen, et al. "A Tunable Ultra-Narrowband Filter for Subcarrier Processing and Optical Monitoring," Optical Fiber Communication Conference, OFC, Los Angeles, CA, vol. 1, Feb. 23-27, 2004, (3 pages).

Richard A. Soref, "Silicon-Based Optoelectronics," Proceedings of the IEEE, vol. 81, No. 12, Dec. 1993, pp. 1687-1706.

C. Angulo Barrios, et al., "Electrooptic Modulation of Silicon-on-Insulator Submicrometer-Size Waveguide Devices," Journal of Lightwave Technology, vol. 21, No. 10, Oct. 2003, pp. 2332-2339.

M.S. Rasras et al., "Demonstration of a Fourth-Order Pole-Zero Optical Filter Integrated Using CMOS Processes," Journal of Lightwave Technology, vol. 25, No. 1, Jan. 2007, pp. 87-92.

Jose Capmany, et al., "A Tutorial on Microwave Photonic Filters," Journal of Lightwave Technology, vol. 24, No. 1, Jan. 2006, pp. 201-229.

Douglas M. Gill, "Resonator-Assisted Control of Radio-Frequency Response in an Optical Modulator," U.S. Appl. No. 11/869,205, filed Oct. 9, 2007 (28 pages).

"CMOS Compatible Guided-Wave Tunable Optical Equalizer," by D. M. Gill et al., Optical Fiber Communication Conference and Exposition National Fiber Optic Engineers Conference, OFCNFOEC 2007, Mar. 25-29, 2007, XP031146788, pp. 1-3.

"Efficient Architectures for Exactly Realizing Optical Filters with Optimum Bandpass Designs," by C. K. Madsen, IEEE Photonics Technology Letters, vol. 10, No. 8, Aug. 1998, XP11046181, pp. 1136-1138.

D.M. Gill et al., "CMOS Compatible Guided-Wave Tunable Optical Equalizer" Lucent Technologies Bell Laboratories in OFC 2007, Anaheim, CA Mar. 25-29, 2007.

Notification of Transmittal of the International Search Report and the Written Opinion of the International Searching Authority, Mailing Date Mar. 26, 2010 for PCT/US2009/0003873 filed Jun. 30, 2009.

* cited by examiner

100

402

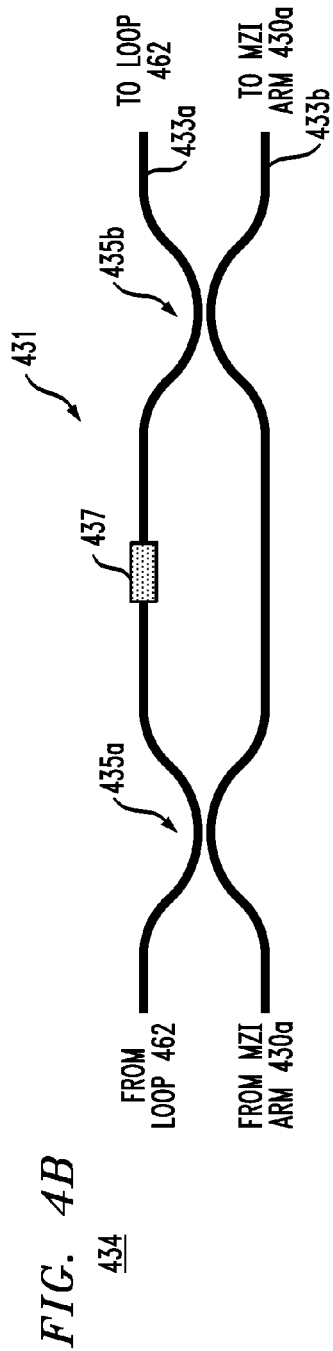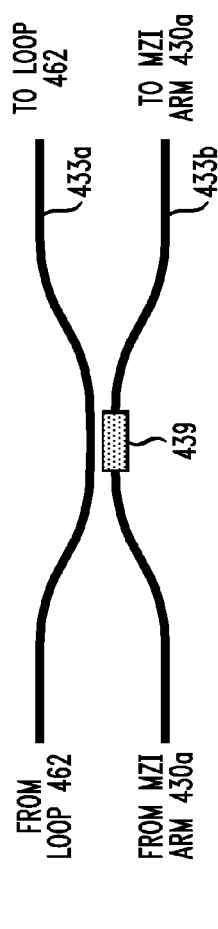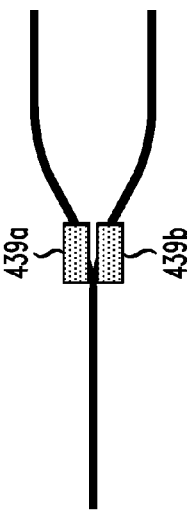
FIG. 4B
434
FIG. 4C
434
FIG. 4D
441

900

RESONATOR-ASSISTED CONTROL OF RADIO-FREQUENCY RESPONSE IN AN OPTICAL MODULATOR

CROSS-REFERENCE TO RELATED APPLICATIONS

This application is a continuation-in-part (CIP) of U.S. patent application Ser. No. 11/869,205, filed Oct. 9, 2007, and entitled "Resonator-Assisted Control of Radio-Frequency Response in an Optical Modulator," which is incorporated herein by reference in its entirety.

This invention was made with Government support under Contract No. HR0011-05-C-0027 awarded by Electronic & Photonic Integrated Circuits—Defense Advanced Research Projects Agency (EPIC-DARPA). The Government has certain rights in this invention.

BACKGROUND OF THE INVENTION

1. Field of the Invention

The present invention relates to optical communication equipment and, more specifically, to optical modulators.

2. Description of the Related Art

An optical modulator is one of the key enabling components of an optical communication system. With the rapidly growing demand for reliable and inexpensive optical modulators, practical viable solutions to improving modulator characteristics are very desirable. One of such characteristics is the modulator's radio-frequency response. Typically, the modulator's ability to impart modulation on an optical beam weakens as the modulation frequency increases. In the optical domain, the frequency-response roll-off affects the modulator bandwidth and can, e.g., distort modulation sidebands, thereby adversely affecting the optical-signal quality.

SUMMARY OF THE INVENTION

According to one embodiment, an optical modulator has a Mach-Zehnder interferometer (MZI) and an optical resonator coupled, via a tunable optical coupler, to one of the MZI internal arms. The optical resonator induces in the MZI frequency-dependent optical losses that can be represented by a comb of spectral resonances. The coupling strength between the optical resonator and the MZI set by the optical coupler controls the magnitude of the resonances, while an optical phase shifter located in the optical resonator controls the spectral position of the resonances. Either the optical coupler or the optical phase shifter, or both, can be tuned to adjust the modulator's radio-frequency response curve, which can be used to improve the optical signal quality over that attainable with prior-art Mach-Zehnder-type optical modulators.

According to another embodiment, an optical modulator of the invention comprises an optical Mach-Zehnder interferometer having first and second internal arms; a first optical resonator; and a first optical coupler adapted to optically couple the first optical resonator and the first internal arm. The optical modulator is adapted to modulate an optical carrier with data applied to a data input of the modulator. The first optical resonator and the first optical coupler are controllably tunable to change radio-frequency response of the modulator to the data modulation.

According to yet another embodiment, a method for modulating light comprises the step of applying an optical carrier to an optical Mach-Zehnder interferometer having first and second internal arms. The optical Mach-Zehnder interferometer is part of an optical modulator. The optical modulator further comprises an optical resonator and an optical coupler adapted to optically couple the optical resonator and the first internal arm. The method further comprises the steps of modulating the optical carrier with data applied to a data input of the modulator; and controllably tuning the optical resonator and the optical coupler to change radio-frequency response of the modulator to the data modulation.

BRIEF DESCRIPTION OF THE DRAWINGS

Other aspects, features, and benefits of the present invention will become more fully apparent from the following detailed description, the appended claims, and the accompanying drawings in which:

FIGS. 4B-C show schematic diagrams of two representative embodiments of a tunable coupler used in the waveguide circuit of FIG. 4A;

FIG. 4D shows a Y-coupler that can be used to implement a tunable coupler used in the waveguide circuit of FIG. 4A;

DETAILED DESCRIPTION

Figure 1:
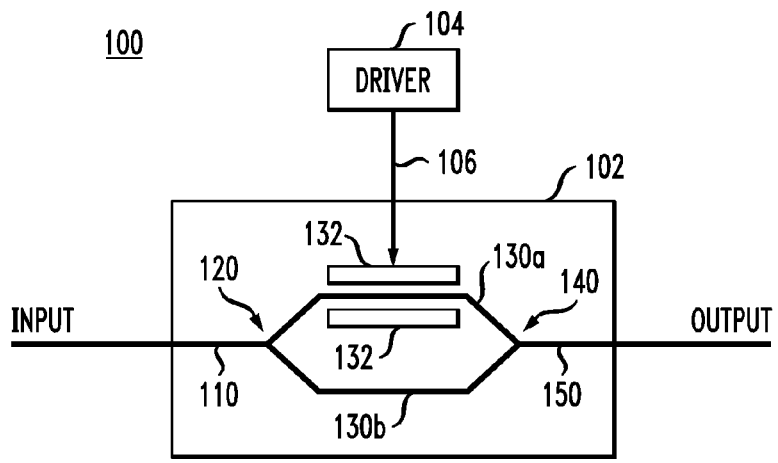
FIG. 1 shows a schematic diagram of a prior-art optical modulator.

FIG. 1 shows a schematic diagram of a prior-art optical modulator 100. Modulator 100 has a waveguide circuit 102 and a driver 104. Waveguide circuit 102 incorporates a Mach-Zehnder interferometer (MZI), the operation of which is based on interference between two optical sub-beams. Driver 104 controls, via a control signal 106, the relative phase shift between the sub-beams and, therefore, the phase and intensity of the optical output beam produced by waveguide circuit 102.

An optical input beam, e.g., generated by a laser (not explicitly shown in FIG. 1), is received by an input waveguide 110 of waveguide circuit 102 and split into two sub-beams by an optical splitter 120. Each of the sub-beams then propagates through a respective one of MZI internal arms 130a-b. The sub-beams are recombined by an optical combiner 140 and the resulting beam is directed into an output waveguide 150.

Control signal 106 is applied to electrodes 132 of MZI arm 130a, which creates an electric field in the material of that MZI arm. The electric field affects the material's refractive index, which in turn affects the optical phase accrued by the sub-beam in MZI arm 130a. In contrast, the optical phase accrued by the other sub-beam in MZI arm 130b is unaffected by control signal 106. If the relative phase shift between the two sub-beams is 180 degrees, then the sub-beams interfere 'destructively' at optical combiner 140 such that the light does not couple into output waveguide 150 and radiates into the substrate of waveguide circuit 102, which results in substantially no light being output from waveguide 150. If the relative phase shift between the two sub-beams is 0 degrees, then the sub-beams interfere 'constructively' such that the light does couple into output waveguide 150 and does not substantially radiate into the substrate of waveguide circuit 102 at optical combiner 140, which results in maximum light intensity being output from waveguide 150. Intermediate phase shift values (e.g., between 0 and 180 degrees) result in intermediate light intensities being transmitted through waveguide circuit 102. The phase of the output signal produced by waveguide circuit 102 is also determined by the voltage of control signal 106.

Figure 2:
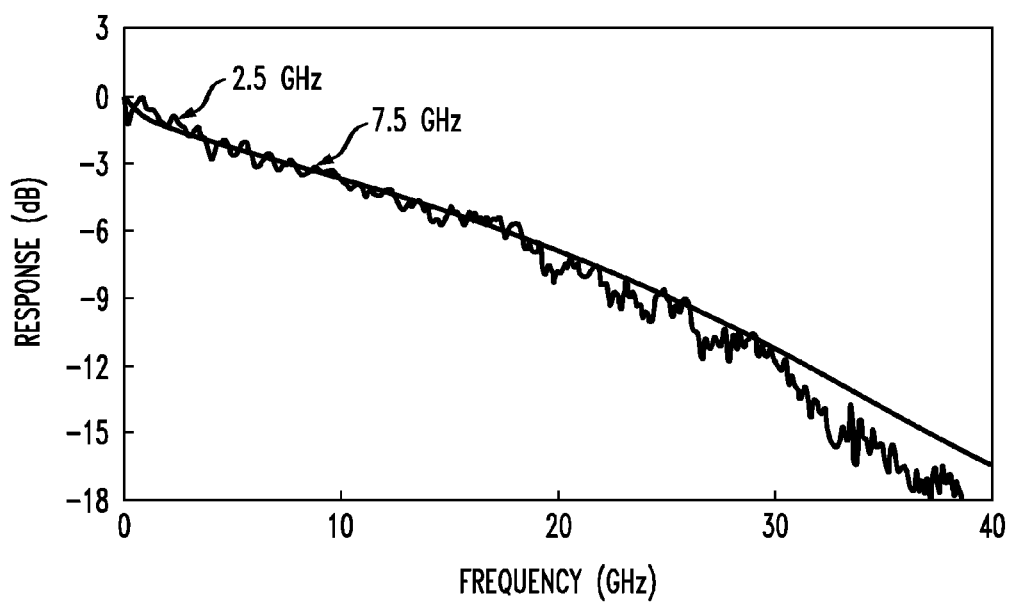
FIG. 2 graphically shows a representative radio-frequency (RF) response of the optical modulator shown in FIG. 1.

FIG. 2 graphically shows a representative radio-frequency (RF) response of modulator 100. More specifically, the "noisy" and smooth traces in FIG. 2 are the experimentally measured and numerically simulated RF response curves, respectively. To obtain an experimental response curve, driver 104 is first configured to apply to waveguide circuit 102 a dc bias voltage that causes the output beam to have approximately 50% of the maximum intensity. Driver 104 is then configured to superimpose a relatively small sinusoidal RF signal onto the dc bias voltage, which causes the intensity of the output beam to become RF modulated. Finally, the frequency of the sinusoidal RF signal is swept across a frequency range of interest while the amplitude of the sinusoid is being kept constant and the amplitude of the intensity modulation at the output of waveguide circuit 102 is being measured. FIG. 2 displays the measurement results on a graph, in which the horizontal and vertical axes represent the frequency of the sinusoidal RF signal expressed in GHz and the amplitude of the optical intensity modulation expressed in dB, respectively. More details on the techniques for measuring RF responses of optical modulators similar to modulator 100 can be found, e.g., in U.S. Pat. No. 7,142,309, which is incorporated herein by reference in its entirety.

Figure 3:
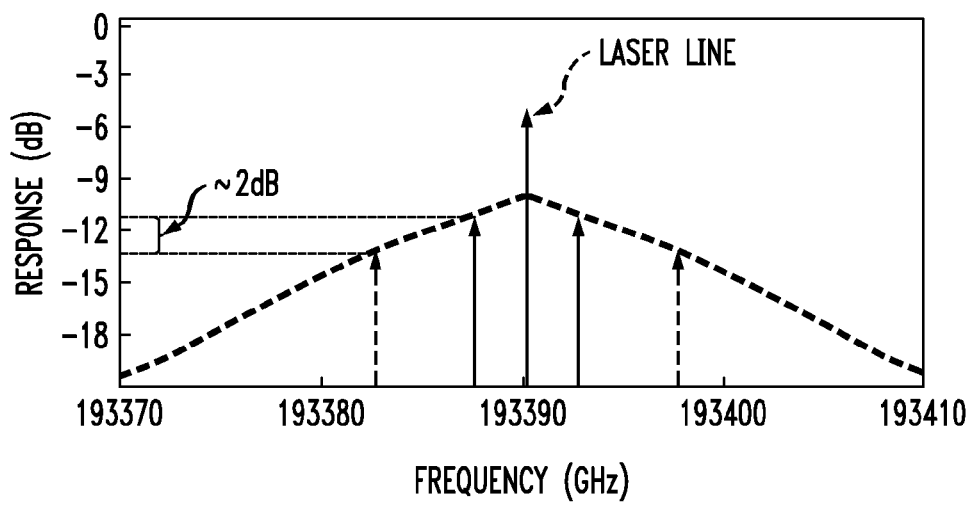
FIG. 3 graphically shows optical-domain manifestation of the RF response shown in FIG. 2.

FIG. 3 graphically shows optical-domain manifestation of the RF response shown in FIG. 2. More specifically, the relatively tall arrow located at about 193,390 GHz represents an optical carrier signal (laser line) applied to waveguide 110 of waveguide circuit 102. RF modulation of the optical carrier signal in waveguide circuit 102 produces one or more optical-modulation sidebands at each side of the carrier. For simplicity, it is assumed here that a single pair of symmetrically located sidebands is generated for a given RF modulation frequency. The relatively short arrows in FIG. 3 depict two such pairs, one pair (solid arrows) corresponding to the modulation frequency of 2.5 GHz and the other pair (dashed arrows) corresponding to the modulation frequency of 7.5 GHz. One skilled in the art will appreciate that the exact shape, or spectral content, of the optical-modulation sidebands depends on the modulation format and device-implementation specifics.

Inspection of FIG. 3 reveals, for example, that increasing a frequency offset with respect to the carrier frequency from 2.5 to 7.5 GHz increases signal attenuation by about 2 dB (see also FIG. 2). When expressed in terms of spectral attenuation gradient (defined as a modulus of the slope of the response curve), this increase in attenuation corresponds to a gradient value of about 0.4 dB/GHz. In general, in the process of imprinting spectral RF components of control signal 106 onto the optical output signal, waveguide circuit 102 weights those spectral components in accordance with the circuit's RF response curve. If the spectral attenuation gradient is relatively large, then the optical waveforms generated by waveguide circuit 102 can contain distortions associated with such weighting, which can disadvantageously cause the optical-signal "eye" closure and/or other detrimental manifestations.

Figure 4A:
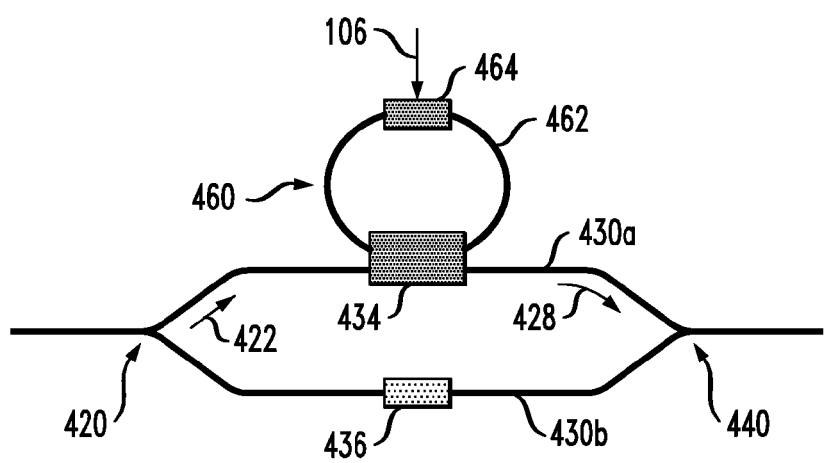
FIG. 4A shows a schematic diagram of a waveguide circuit that can be used in the optical modulator of FIG. 1 according to one embodiment of the invention.

FIG. 4A shows a schematic diagram of a waveguide circuit 402 that can replace waveguide circuit 102 in optical modulator 100 according to one embodiment of the invention. Similar to waveguide circuit 102, waveguide circuit 402 incorporates an MZI having two MZI internal arms 430a-b. However, one difference between waveguide circuits 102 and 402 is that, in the latter, MZI arm 430a is coupled via a thermo-optic coupler 434 to an optical resonator 460. Thermo-optic coupler 434 is tunable and is designed to control the coupling strength between MZI arm 430a and resonator 460. Note that a tunable coupling means other than thermo-optic can be used for coupler 434. Methods, such as carrier injection, carrier depletion, stress, photorefractive effects, or other techniques that enable controllable change of the effective refractive index of waveguide material(s), can be used as a physical principle of operation for thermo-optic coupler 434.

Resonator 460 has a waveguide loop 462 and an electro-optic phase shifter 464 located in the loop. A suitable phase shifter that can be used as phase shifter 464 is disclosed, e.g., in U.S. Patent Application Publication No. 2006/0045522, which is incorporated herein by reference in its entirety. Phase shifter 464 has electrodes (not explicitly shown in FIG. 4) that act similar to electrodes 132 of waveguide circuit 102 and can be driven by control signal 106. In addition, MZI arm 430b incorporates a thermo-optic phase shifter 436 that can be used to adjust the relative phase difference between the optical sub-beams in MZI arms 430a-b, e.g., when thermo-optic coupler 434 is tuned to change the coupling strength between MZI arm 430a and resonator 460. Furthermore, phase shifter 436 can be used to configure waveguide circuit 402 for optimal performance with various transmission formats. For example, if basic on/off keying is used, then phase shifter 436 is set to achieve about a 50% power output, or to a setting such that a minimum optical power output is attained when the modulator is in a state corresponding to an 'off' state of control signal 106. Alternately, for a duobinary or differential phase-shift-keying format, phase shifter 436 can be set to create appropriate power output from waveguide circuit 402 for that modulation format.

FIGS. 4B-C show schematic diagrams of two representative embodiments of tunable coupler 434. Tunable coupler 434 shown in FIG. 4B has an MZI 431, in which the operating principles described above in reference to the MZI of waveguide circuit 102 (FIG. 1) are used to control the amount of light emitted from each of output ports 433a-b. However, in the case of MZI 431, since there are two output ports, the light that was previously described as radiating into the substrate now substantially couples into alternate output ports 433a-b. MZI 431 has two 50/50 directional couplers 435a-b and a thermo-optic phase shifter 437. The latter is similar to the above-described thermo-optic phase shifter 436.

FIG. 4C illustrates a directional coupler approach to the implementation of tunable coupler 434. More specifically, tunable coupler 434 of FIG. 4C has a heater 439 that is used to change the optical coupling properties between two proximate waveguides and thus control the amount of light emitted from each of output ports 433a-b.

FIG. 4D shows a Y-coupler 441, two of which can be serially connected to implement tunable coupler 434. Each of the "upper Y" branches of coupler 441 has a respective heater 439 that can controllably change the transmission characteristics through the branch. Furthermore, Y-coupler 441 can be used in circumstances where only one input waveguide and two output waveguides are needed. Such circumstances present themselves, e.g., in waveguide circuit embodiments shown in FIGS. 10 and 11.

Figure 5A:
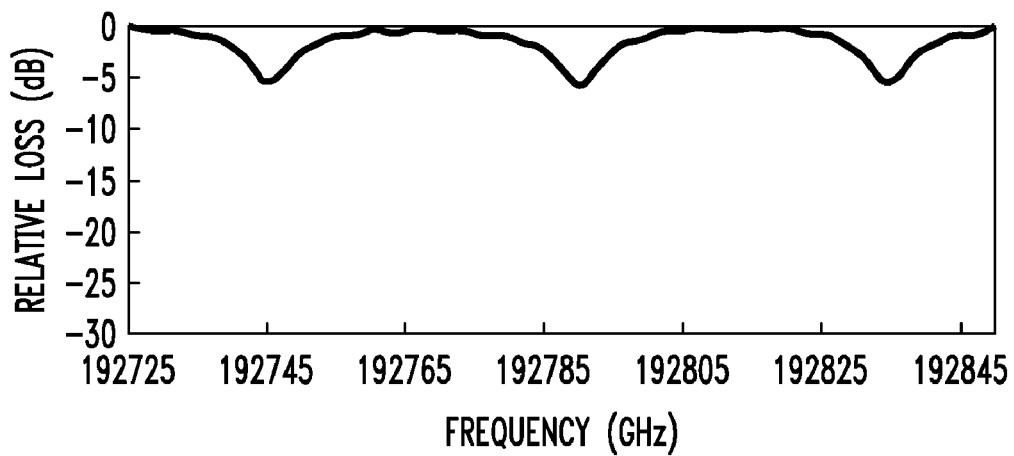
FIGS. 5A-F graphically show representative spectral characteristics of the waveguide circuit of FIG. 4.
Figure 5B:
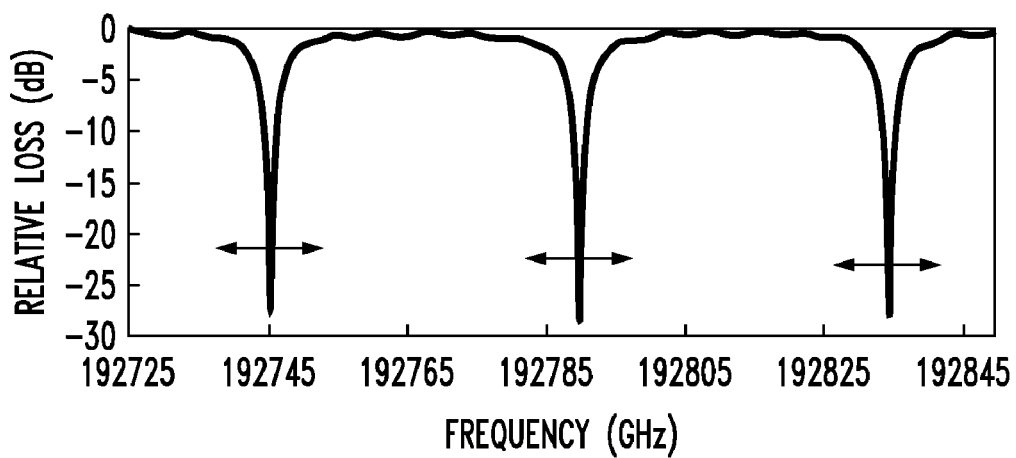

FIGS. 5A-B graphically show representative loss curves for MZI arm 430a and resonator 460. More specifically, FIG. 5A shows a loss curve for the configuration, in which coupler 434 has been tuned and fixed to moderately couple resonator 460 to MZI arm 430a. The moderate coupling condition can be achieved, e.g., when the coupling factor $\rho=(1-\kappa)^{0.5}$ is smaller than the field attenuation factor in the resonator $\gamma=10^{-\alpha L/20}$, where $\epsilon$ is the coupling coefficient of the coupler, $\alpha$ and L are the loss coefficient and cavity length of the resonator, respectively, such that $\alpha L$ represents the resonator round-trip loss expressed in dB. FIG. 5B shows a loss curve for the configuration, in which coupler 434 has been tuned and fixed to critically couple resonator 460 to MZI arm 430a. The critical coupling condition can be achieved, e.g., when coupling factor $\rho$ is close to field attenuation factor $\gamma$. The loss curves shown in each of FIGS. 5A-B are produced in the absence of data modulation by slowly changing the wavelength of the (non-modulated, CW) optical input signal applied to waveguide circuit 402.

The dips in the loss curves shown in FIGS. 5A-B, also often referred to as spectral resonances, are caused by interference between the light making round trips through the resonator loop. The resonances are separated from one another by a frequency interval that corresponds to 1/T, where T is the round-trip transit time in resonator 460. The coupling strength set by coupler 434 controls the partition of light between the direct propagation path and the loop "detour" path and, therefore, determines the extent of light extinction due to the interference. In a representative embodiment of waveguide circuit 402, coupler 434 enables the magnitude of the loss curve (the depth of the dips) to be tunable between about 0 and 30 dB.

The effective optical length of resonator 460 is determined by the physical length of loop 462, including the coupler, the passive, and the active (phase shifter 464) waveguide portions of the loop, multiplied by the effective optical refractive indices of each section. This includes the optical phase accrued by the optical signal in electro-optic phase shifter 464. A dc bias voltage applied to phase shifter 464 controls the optical phase accrued therein and therefore the spectral position of and/or the spectral separation between the resonances. Alternately, two dc biases can be applied to the coupler in a way that can control the position of the resonances. A periodic driving signal, e.g., a pseudo-random bit sequence (PRBS) applied to phase shifter 464 via control signal 106, has the effect of spectrally moving the comb of resonances in a corresponding periodic manner, e.g., as indicated by the double-headed arrows in FIG. 5B. A non-periodic driving signal, e.g., that corresponding to a random bit stream (RBS), will also move the comb of resonances, but in a non-periodic manner that reflects the specific bit sequence carried by the RBS. If averaged over time, the effect of modulation-induced comb motion is to broaden the resonances and to reduce their depth.

Figure 5C:
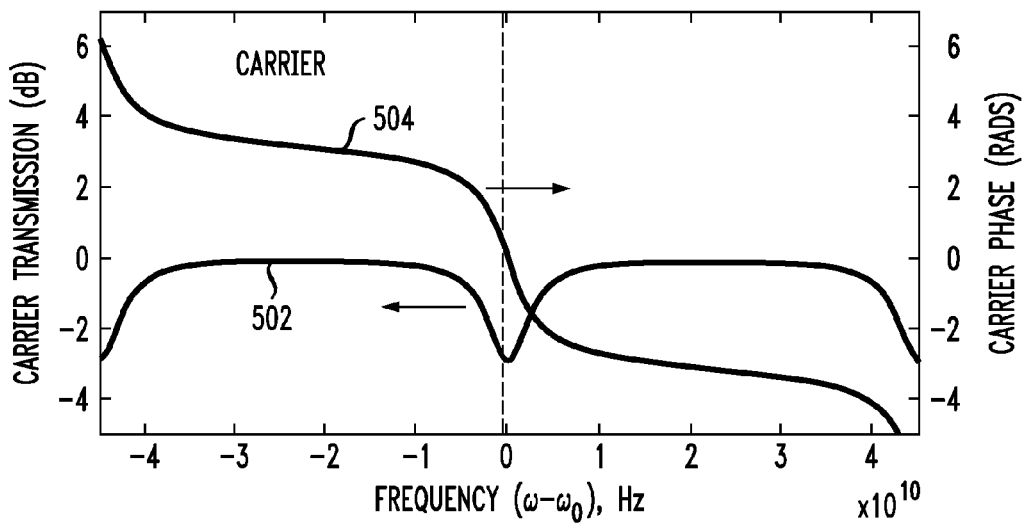
Figure 5D:
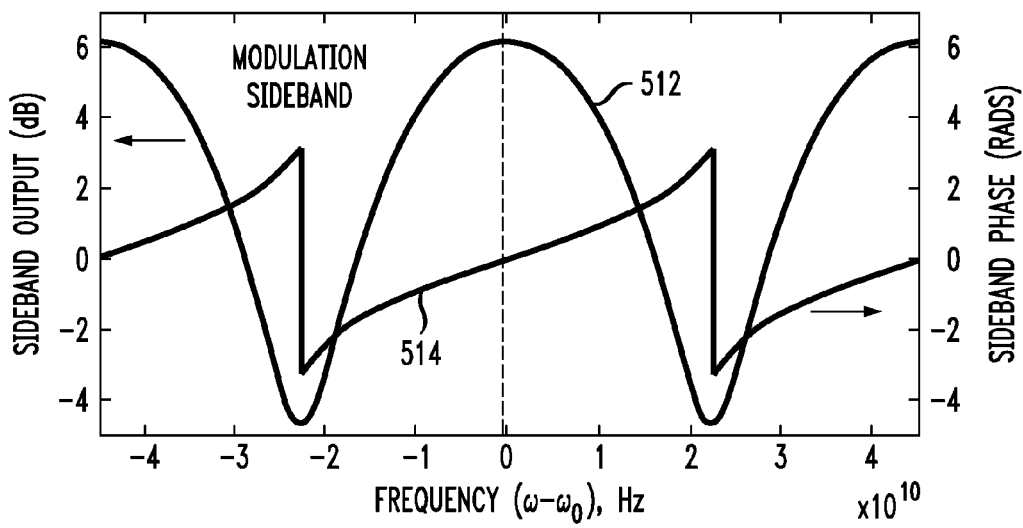

FIGS. 5C-D graphically show the effect of resonator 460 on carrier-frequency and modulation-sideband components, respectively, of an optical signal processed by waveguide circuit 402. Loss curve 502 shown in FIG. 5C is analogous to each of the loss curves shown in FIGS. 5A-B. Note that loss curve 502 has a minimum at frequency $\omega_0$. Phase curve 504 (also shown in FIG. 5C) plots a phase shift imparted by resonator 460 onto the carrier-frequency component of optical signal 422 in the course of transforming that signal into optical signal 428 (see FIG. 4).

The data modulation imparted by phase shifter 464 causes the spectral content of optical signal 428 to be different from the spectral content of optical signal 422. More specifically, the phase modulation causes optical signal 428 to have modulation-sideband components in addition to the carrier-frequency component originally present in signal 422. Transfer curve 512 and phase curve 514 shown in FIG. 5D characterize the amplitude and phase, respectively, of the modulation-sideband components of optical signal 428. Note that transfer curve 512 is a normalized curve. The normalization value is obtained by treating phase shifter 464 as "an effective light source" that generates an optical sideband within resonator 460 and taking the output power of that effective light source as a reference level. Thus, the value of 0 dB on the (left-side) vertical axis in FIG. 5D corresponds to a situation, in which the sideband power in optical signal 428 is the same as the sideband power generated within resonator 460. Transfer curve 512 indicates that, depending on the frequency, interference effects can either enhance or suppress the sideband power in optical signal 428 with respect to that inside resonator 460.

Similar to loss curve 502, transfer curve 512 is a quasi-periodic curve having a plurality of dips separated by 1/T. However, the dips of transfer curve 512 are spectrally shifted with respect to the spectral resonances of loss curve 502 by about ½ T, which aligns a maximum of transfer curve 512 with a minimum of loss curve 502. This relative spectral alignment of curves 502 and 512 is substantially preserved even when coupler 434 and/or phase shifter 464 are being tuned or receive an RF-modulated control signal.

Figure 5E:
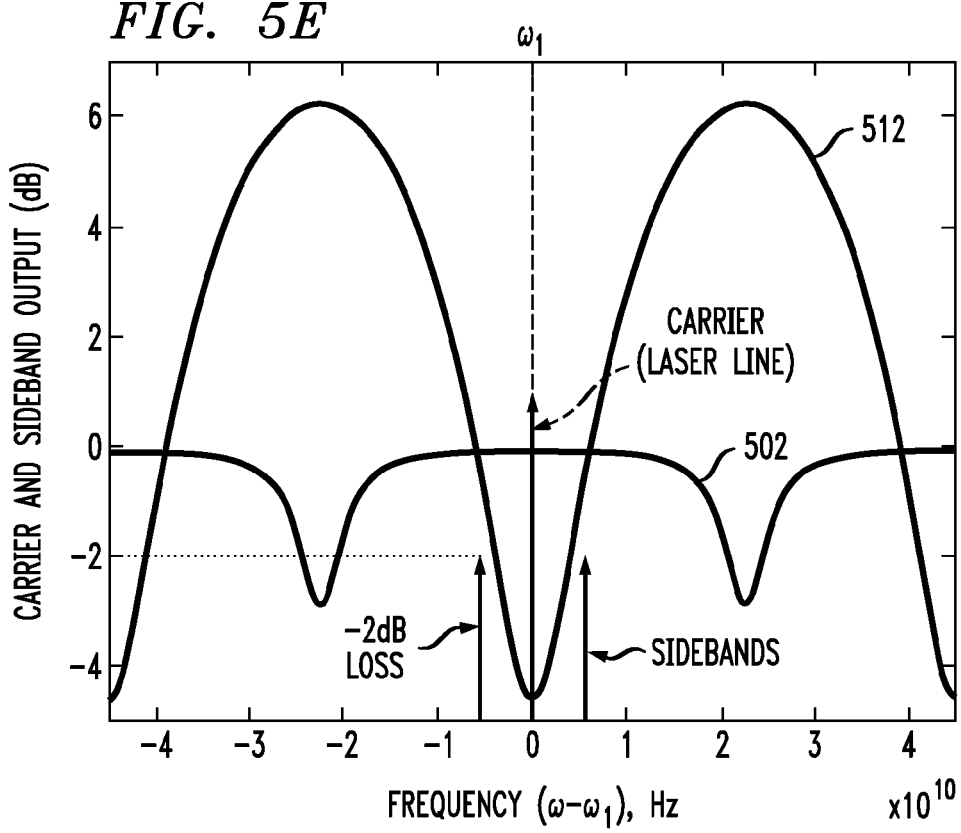
Figure 5F:
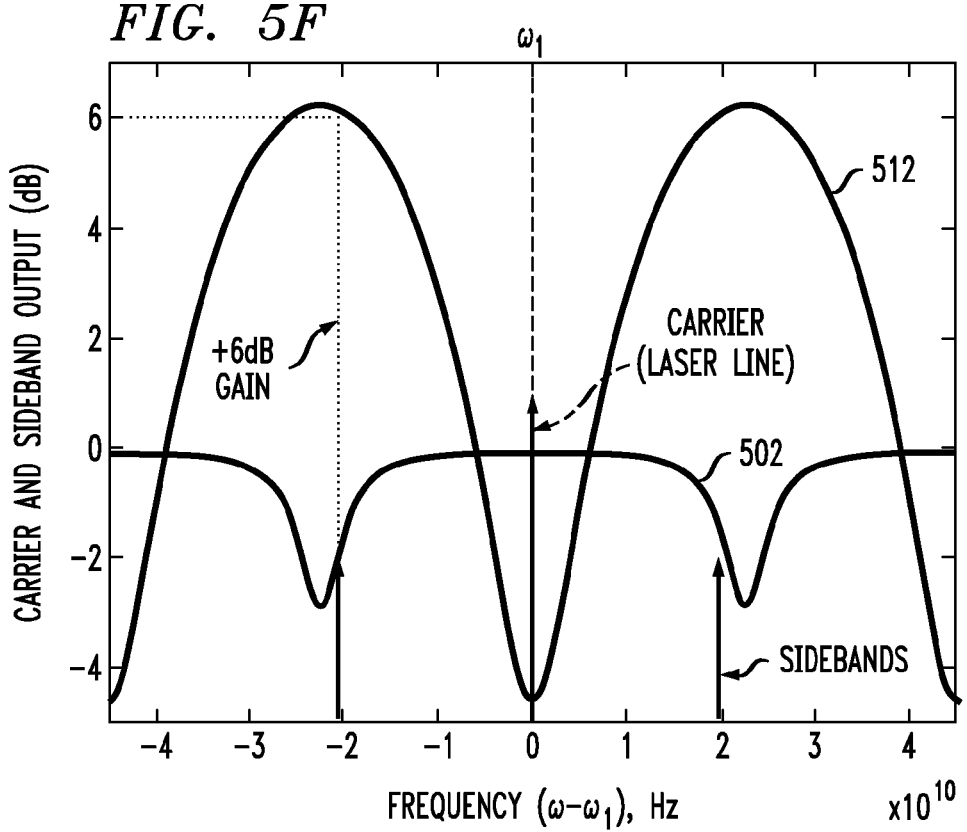

FIGS. 5E-F graphically show the effect of data-modulation frequency (e.g., that of control signal 106) on the sideband power in optical signal 428. More specifically, each of FIGS. 5E-F shows curves 502 and 512 (see also FIGS. 5C-D) along with three vertical arrows that represent exemplary spectral components of optical signal 428. The relatively tall arrow in the middle represents the carrier-frequency component of optical signal 428, and the two relatively short arrows at both sides of the carrier-frequency component represent two modulation-sideband components of that optical signal. FIG. 5E corresponds to a modulation frequency of about 5 GHz, which causes each of the modulation-sideband components to be spectrally separated from the carrier-frequency component by about 5 GHz. FIG. 5F corresponds to a modulation frequency of about 20 GHz, which causes each of the modulation-sideband components to be spectrally separated from the carrier-frequency component by about 20 GHz.

The settings of coupler 434 and resonator 460 are selected so as to spectrally place the carrier frequency (labeled $\omega_1$ in FIGS. 5E-F) substantially equidistantly between two adjacent spectral resonances of loss curve 502. This spectral placement also aligns the carrier frequency with a dip of transfer curve 512. As already indicated above in reference to FIGS. 5C-D, loss curve 502 applies to the carrier-frequency component, whereas transfer curve 512 applies to the modulation-sideband components. Inspection of FIGS. 5E-F then reveals that, with the amplitude of control signal 106 being fixed, a change in the modulation frequency of the control signal from about 5 GHz to about 20 GHz causes the modulation-sideband power to change by about 8 dB. In particular, FIG. 5E indicates that, at 5 GHz, the interference effects induced by resonator 460 cause an effective power loss of about −2 dB for the modulation-sideband components of optical signal 428. Similarly, FIG. 5F indicates that, at 20 GHz, those interference effects cause an effective power gain of about +6 dB for the modulation-sideband components.

If waveguide circuit 102 is replaced in modulator 100 by waveguide circuit 402, then one can use the above-described spectral characteristics of resonator 460 to favorably modify the modulator's RF response and improve the overall quality of the optical output signal. As an example, three useful configurations of waveguide circuit 402 are described below in reference to FIGS. 6A-B, 7A-B, and 8A-B, respectively. More specifically, the waveguide-circuit configuration illustrated by FIGS. 6A-B helps to flatten the optical-domain response curve shown in FIG. 3. The waveguide-circuit configuration illustrated by FIGS. 7A-B helps to bandwidth-limit the optical-domain response curve. The waveguide-circuit configuration illustrated by FIGS. 8A-B helps to invert the optical-domain response curve. One skilled in the art will appreciate that other configurations of waveguide circuit 402 can similarly be used to achieve other desired modifications of the modulator's RF-response curve.

Figure 6A:
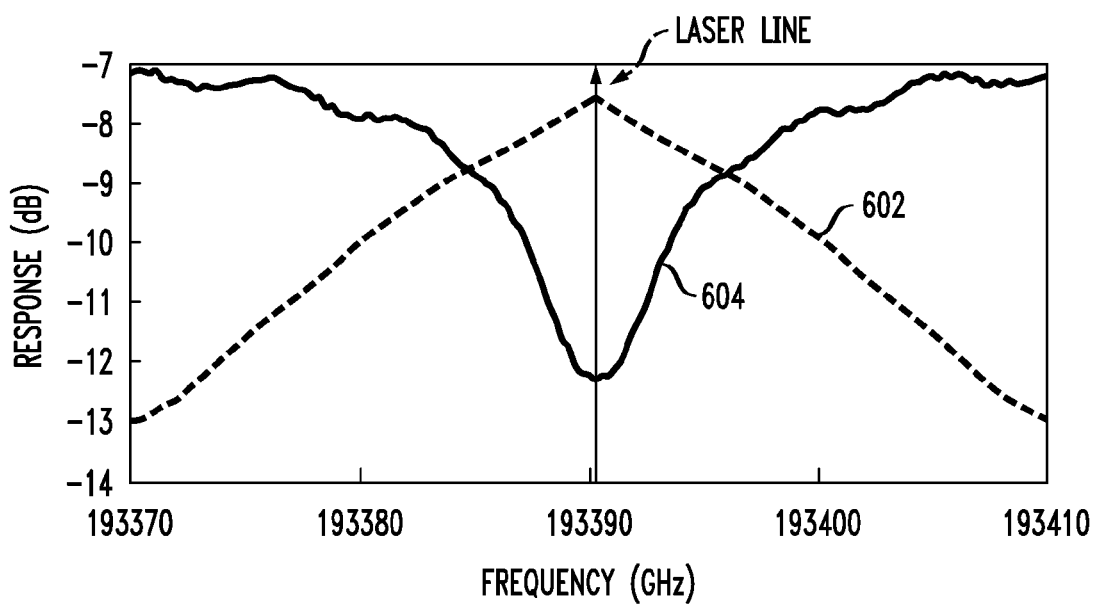
FIGS. 6A-B graphically show how the waveguide circuit of FIG. 4 can be used to produce a relatively flat optical-domain response curve for a modulator employing that waveguide circuit.
Figure 6B:
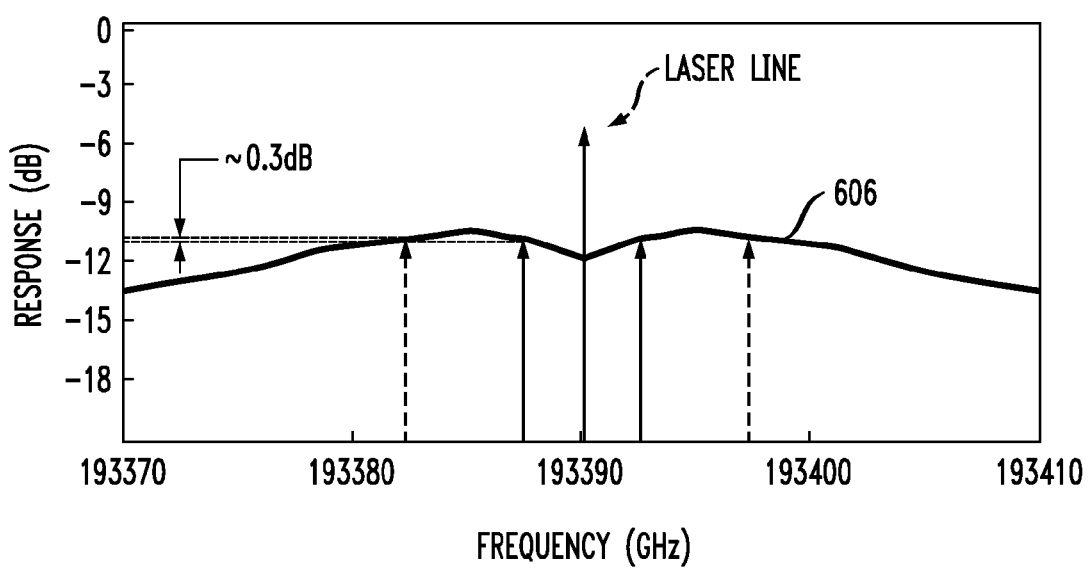

FIGS. 6A-B graphically show how waveguide circuit 402 can be used to produce a relatively flat optical-domain response curve for a modulator employing that waveguide circuit. The results of FIG. 6 can also be viewed as illustrating a method of broadening the bandwidth. More specifically, bandwidth is often defined as the spectral width between two points corresponding to a 3-dB attenuation. Since flattening of the response curve broadens the frequency separation between the 3-dB attenuation points, it thereby increases the bandwidth.

Referring first to FIG. 6A, a dashed line 602 shows the optical-domain response curve of waveguide circuit 402 when thermo-optic coupler 434 is configured such that the coupler fully couples light to the cross state, thereby causing the light to make one complete round trip within resonator 460 and then be substantially fully coupled out of the resonator and back into MZI arm 430a. This configuration effectively minimizes the resonator effect on the modulator response. Furthermore, response curve 602 predominantly represents the electro-optic response of the phase shifting component, i.e., phase shifter 464. The setting of the coupler can also be tuned to increase (e.g., maximize) the resonator effect on the modulator response. Response curve 604 characterizes the modulation-sideband frequency response of MZI arm 430a and resonator 460 in the latter configuration.

Note that the shape of response curve 602 is similar to that of the response curve shown in FIG. 3. The shape of response curve 604 substantially represents the shape of time-averaged transfer curve 512. The effective optical length of resonator 460 is selected so that the minimum (or the center point) of a dip in response curve 604 is substantially lined up with the laser line (optical carrier-frequency component) represented by the arrow located at about 193,390 GHz. As already indicated above in reference to FIGS. 5C-F, this spectral alignment also means that the laser line is spectrally placed substantially equidistantly between two adjacent time-averaged spectral resonances of loss curve 502 (not explicitly shown in FIG. 6A). Generally, one can spectrally align a resonance comb with a carrier frequency by appropriately setting the effective optical length for the optical resonator.

Referring now to FIG. 6B, a solid line 606 shows the optical-domain response curve of waveguide circuit 402 for the same coupling strength as that corresponding to response curve 604. One skilled in the art will understand that response curve 606 is substantially a product of response curves 602 and 604. As in FIG. 3, the relatively short arrows in FIG. 6B depict two pairs of modulation sidebands, one pair (solid arrows) corresponding to the modulation frequency of 2.5 GHz and the other pair (dashed arrows) corresponding to the modulation frequency of 7.5 GHz. Note that the difference in attenuation for 2.5 and 7.5 GHz imposed by response curve 606 is now only about 0.3 dB, which corresponds to a spectral attenuation gradient value of about 0.06 dB/GHz.

This relatively low value of the spectral attenuation gradient can be achieved, e.g., by appropriately tuning thermo-optic coupler 434 to find an optimal coupling strength that produces an optimal shape for response curve 604 and forces response curve 606 to attain a relatively flat shape. Intermediate coupling strengths (e.g., between 1 and the optimal coupling strength) will result in intermediate spectral attenuation gradient values (e.g., between about 0.3 and 0.06 dB/GHz). Note also that, in such a configuration, the resonator is preferably designed such that the relaxation time of the resonator is faster than the spectral response components of the signal at that frequency. The relatively flat shape of response curve 606 enables the spectral RF components of control signal 106 to be more accurately imprinted onto the optical signal with waveguide circuit 402 than with waveguide circuit 102. As a result, optical waveforms generated by waveguide circuit 402 advantageously contain fewer and/or smaller distortions than optical waveforms generated by waveguide circuit 102.

For optimal performance, certain transmission formats use a transmitter having a bandwidth that is limited to a specified frequency range. For example, low-pass filtered duobinary is a transmission format that, at a bit rate of about 40 Gb/s, enables favorable performance if the transmitter has a bandwidth between about 10 and 13 GHz. In prior-art communication systems, bandwidth limiting is often achieved by passing the electrical drive signal (such as control signal 106, FIG. 1) through an appropriate electrical bandpass filter before applying the drive signal to a circuit analogous to waveguide circuit 102. Alternatively, bandwidth limiting is achieved by placing an appropriate optical bandpass filter at the modulator output. Both of these prior-art bandwidth-limiting solutions disadvantageously use extra components (filters), which increases the level of complexity and cost of the corresponding optical communication system.

Figure 7A:
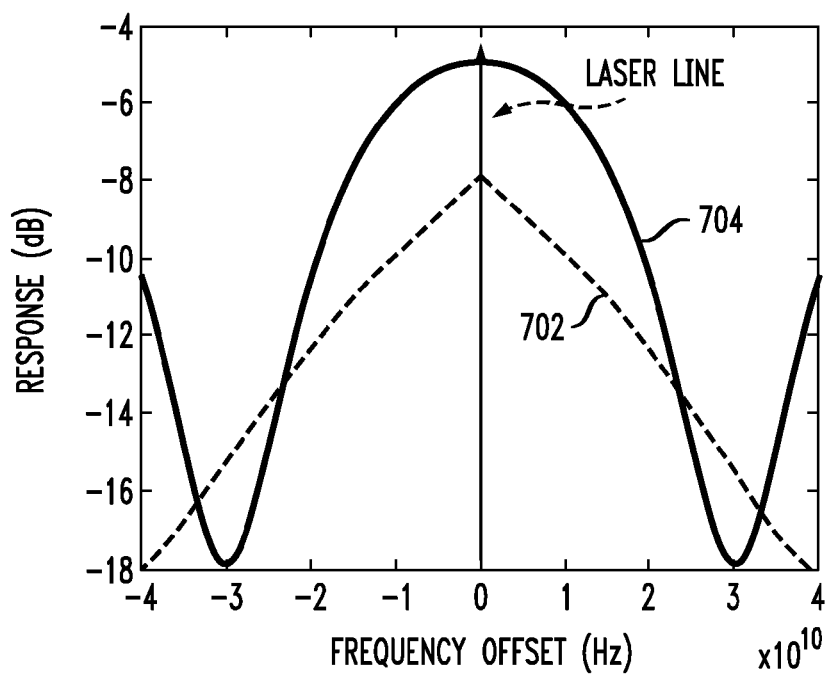
FIGS. 7A-B graphically show how the waveguide circuit of FIG. 4 can be used to controllably limit the bandwidth of a modulator employing that waveguide circuit.
Figure 7B:
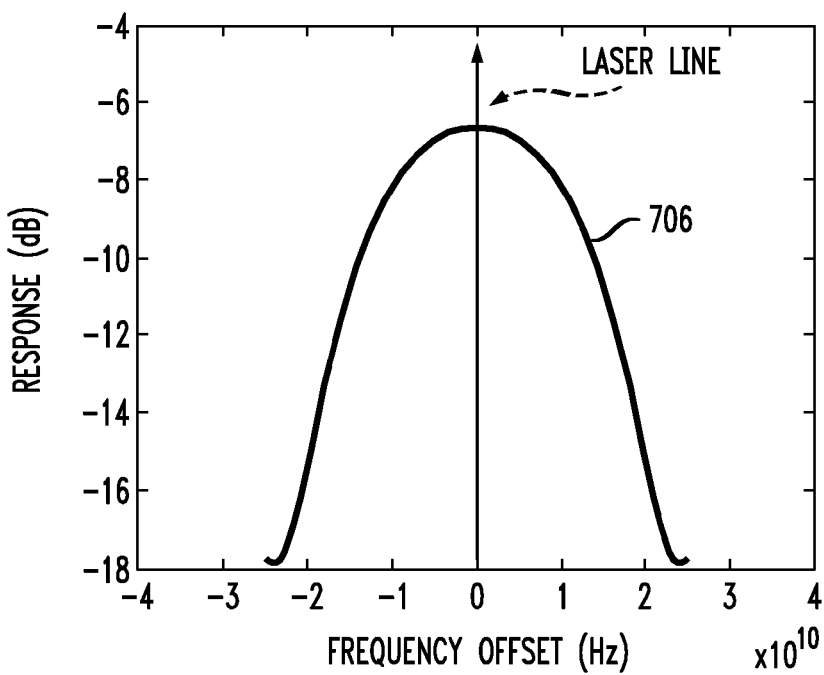

FIGS. 7A-B graphically show how waveguide circuit 402 can be used to controllably limit the bandwidth of a modulator employing that waveguide circuit without the use of additional electrical or optical bandpass filters. Referring first to FIG. 7A, a dashed line 702 reproduces response curve 602 (see FIG. 6A). A solid line 704 has a shape corresponding to that of time-averaged transfer curve 512. Note that the effective optical length of resonator 460 is now selected so that the laser line is located approximately at the midpoint between two adjacent dips of response curve 704. As indicated above in reference to FIGS. 5C-F, this spectral alignment also means that the laser line is spectrally aligned with one of time-averaged spectral resonances of loss curve 502 (not explicitly shown in FIG. 7A).

Referring now to FIG. 7B, a solid line 706 shows the optical-domain response curve of waveguide circuit 402 for the same coupling strength as that corresponding to response curve 704. One skilled in the art will appreciate that response curve 706 is substantially a product of response curves 702 and 704. Note that the bandwidth defined by response curve 706 is smaller than the bandwidth defined by response curve 702. The extent of bandwidth reduction is controlled by the spectral separation between the dips of response curve 704 and the depth of those dips. The spectral separation between the dips can be selected by (i) selecting an appropriate physical length for waveguide loop 462 and/or (ii) tuning phase shifter 464. For a given physical length of waveguide loop 462, the degree of bandwidth limitation can be controllably adjusted with thermo-optic coupler 434 and/or phase shifter 464 to optimize the modulator performance for a given set of transmission-link conditions, such as the amount of residual dispersion and other transmission-link impediments. In addition, multiple resonators could be used to further shape the spectral response of the modulator.

Figure 8A:
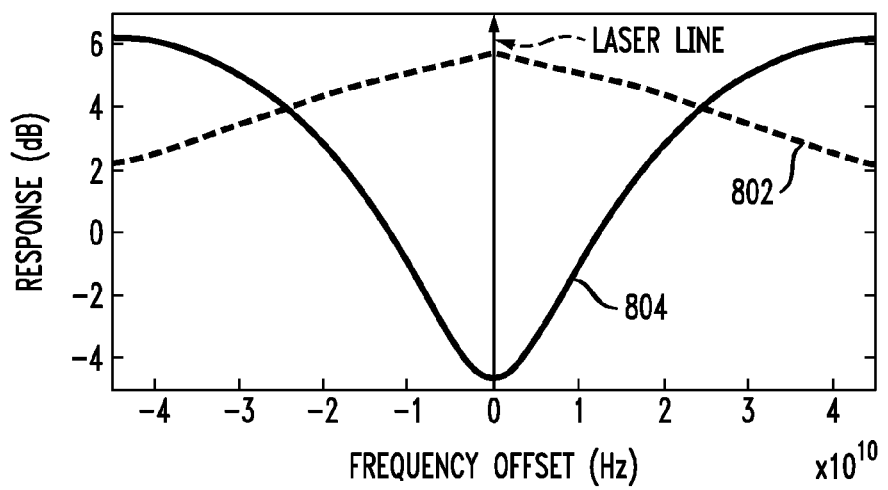
FIGS. 8A-B graphically show how the waveguide circuit of FIG. 4 can be used to invert the optical-domain response curve for a modulator employing that waveguide circuit.
Figure 8B:
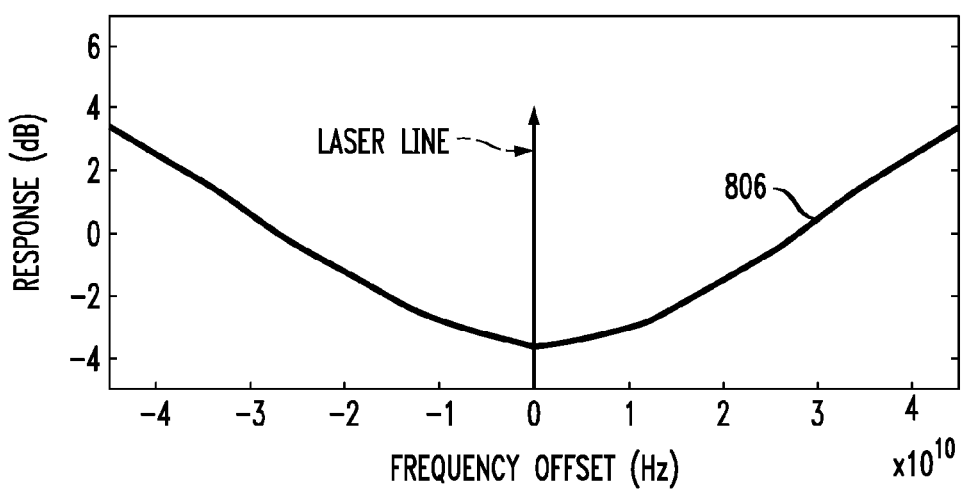

FIGS. 8A-B graphically show how waveguide circuit 402 can be used to invert the optical-domain response curve for a modulator employing that waveguide circuit. Referring first to FIG. 8A, a dashed line 802 shows a response curve that is analogous to response curve 602 (see FIG. 6A). A solid line 804 has a shape corresponding to that of time-averaged transfer curve 512. Note that the effective optical length of resonator 460 is selected so that the minimum (or the center point) of a dip in response curve 804 is substantially lined up with the laser line. This spectral alignment also means that the laser line is spectrally placed substantially equidistantly between two adjacent time-averaged spectral resonances of loss curve 502 (not explicitly shown in FIG. 8A).

Response curve 802 differs from response curve 602 in that it is a shallower curve, meaning that it is characterized by a smaller value of the spectral attenuation gradient. More specifically, response curve 802 has a gradient value of about 0.1 dB/GHz, as opposed to a gradient value of about 0.3 dB/GHz for response curve 602. One skilled in the art will appreciate that, depending on the circuit implementation details and the fabrication technology, waveguide circuits might have a relatively wide variation in their optical-domain RF response and therefore exhibit different spectral-attenuation gradients. This variability can be exploited to select conditions, under which response curve 804 can be a steeper curve than response curve 802, e.g., as shown in FIG. 8A. It can be further appreciated by one skilled in the art that, if response curve 802 had a spectral-attenuation gradient equal to that of response curve 602, e.g., 0.3 dB/GHz, then response curve 804 could be appropriately modified to be steeper than curve 802 (and curve 602) to effectively produce a physical circuit configuration analogous to that currently illustrated by FIGS. 8A-B.

Referring now to FIG. 8B, a solid line 806 shows the optical-domain response curve of waveguide circuit 402 corresponding to response curves 802 and 804. One skilled in the art will appreciate that response curve 806 is substantially a product of response curves 802 and 804. Note that, because response curve 804 is steeper than response curve 802, response curve 806 is an inverted optical-domain response curve. The term "inverted" should be read here to mean that the sideband attenuation generally decreases with an increase of the modulation frequency (or the spectral separation from the carrier frequency). Recall that the optical-domain response curve of waveguide circuit 102 is characterized by sideband attenuation that generally increases with an increase of the modulation frequency. The results shown in FIGS. 8A-B indicate that waveguide circuit 402 can be used in effect to overcompensate the radio-frequency roll-off inherent to the optical modulator itself. The "excess" compensation then can be used, e.g., to at least partially compensate the RF-frequency roll-off produced by communication-system elements external to the optical modulator having waveguide circuit 402.

Figure 9:
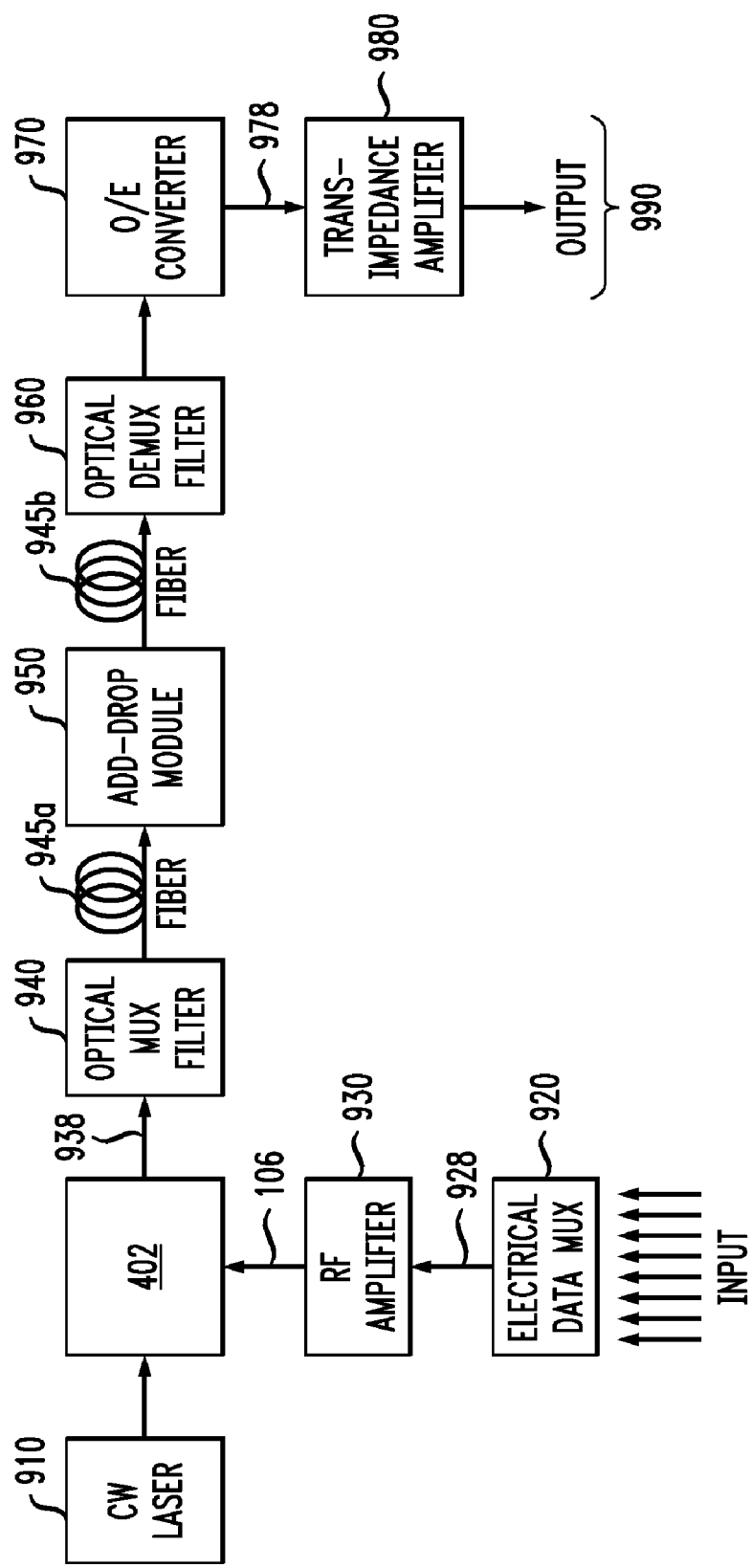
FIG. 9 shows a block diagram of a communication system employing the waveguide circuit of FIG. 4 according to one embodiment of the invention.

FIG. 9 shows a block diagram of a communication system 900 employing waveguide circuit 402 according to one embodiment of the invention. A CW laser 910 provides a carrier-frequency signal for waveguide circuit 402. An RF amplifier 930 uses a multiplexed data signal 928 generated by a data multiplexer (MUX) 920 to generate data-modulated control signal 106. Waveguide circuit 402 modulates the carrier-frequency signal as described above and launches a resulting modulated optical signal 938 toward an optical receiver 990. En route to receiver 990, optical signal 938 might traverse one or more instances of some or all of the following elements: an optical MUX filter 940, a long-haul optical transmission fiber 945, an add-drop module 950, and an optical de-MUX filter 960. An optical-to-electrical (O/E) converter 970 of receiver 990 converts the received optical signal into a corresponding electrical signal 978, which is then processed by a trans-impedance amplifier 980.

Some or all of data MUX 920, RF amplifier 930, optical MUX filter 940, add-drop module 950, optical de-MUX filter 960, O/E converter 970, and trans-impedance amplifier 980 might have bandwidth limitations. These bandwidth limitations typically manifest themselves, e.g., as a radio-frequency roll-off qualitatively similar to that shown in FIG. 3. Advantageously, waveguide circuit 402 can be used to mitigate the detrimental affects of these bandwidth limitations. For example, waveguide circuit 402 can be configured as described above in reference to FIGS. 8A-B to post-compensate the radio-frequency roll-off imposed by data MUX 920 and/or RF amplifier 930 so that the composite RF response of the optical modulator formed by the waveguide circuit, the data MUX, and the RF amplifier is substantially flat over a relatively wide spectral interval or is characterized by a relatively small spectral attenuation gradient, e.g., similar to that corresponding to response curve 606 shown in FIG. 6B. Alternatively or in addition, waveguide circuit 402 can be configured as described above in reference to FIGS. 8A-B to pre-compensate the radio-frequency roll-off imposed by one or more of optical MUX filter 940, add-drop module 950, optical de-MUX filter 960, O/E converter 970, and trans-impedance amplifier 980. One skilled in the art will appreciate that this post-compensation and/or pre-compensation is advantageously capable of reducing the number of decoding errors at receiver 990.

One skilled in the art will appreciate that communication system 900 might include optical switches for rerouting optical signal 938 to a different receiver (not explicitly shown in FIG. 9) analogous to receiver 990. This rerouting is likely to change the radio-frequency roll-off imposed onto optical signal 938 en route to that different receiver. In this situation, waveguide circuit 402 can be re-configured so that the pre-compensation imposed by it matches the radio-frequency roll-off corresponding to the new destination. In general, waveguide circuit 402 can be dynamically reconfigured to have the bandwidth characteristics that are most advantageous for the current routing configuration.

In one embodiment, waveguide circuit 402 can be used in a wavelength-division-multiplexing (WDM) communication system to generate a communication signal, e.g., an add signal, corresponding to one of the (idle or dropped) WDM channels. Optical communication signals corresponding to other WDM channels are usually characterized by a particular level and/or type of signal distortion. The control over the RF-response enabled by waveguide circuit 402 and exemplified by FIGS. 6-8 can then be used to (pre)distort, in a controllable manner, the added signal so as to substantially match the existing-channel distortion. As a result, all signals in the WDM multiplex can have similar signal characteristics independent of the add/drop function, which enables the communication system to process the whole WDM multiplex in a uniform and consistent manner.

Figure 10:
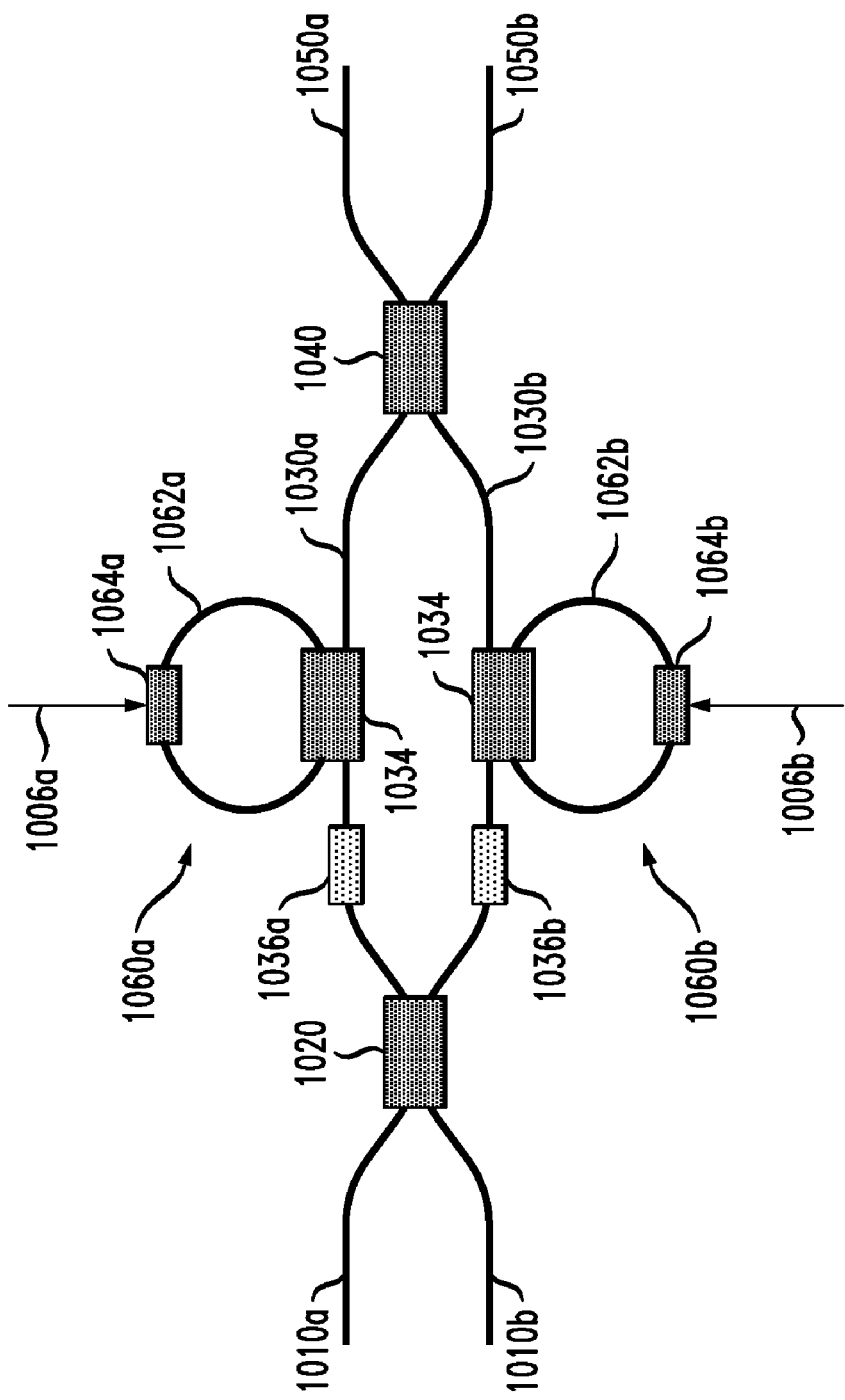
FIG. 10 shows a schematic diagram of a waveguide circuit that can be used in an optical modulator that is analogous to the optical modulator of FIG. 1 according to one embodiment of the invention.

FIG. 10 shows a schematic diagram of a waveguide circuit 1002 that can be used in an optical modulator that is analogous to optical modulator 100 according to one embodiment of the invention. Waveguide circuit 1002 is generally analogous to waveguide circuit 402 (FIG. 4), and analogous elements of the two circuits are designated with labels having the same last two digits. In the description that follows, differences in the structure and operation of these two waveguide circuits are explained in more detail.

Referring to both FIGS. 4 and 10, instead of an optical splitter 420 used in waveguide circuit 402, waveguide circuit 1002 employs a thermo-optic coupler 1020. As a result, either one of waveguides 1010*a-b* can serve as an input waveguide for waveguide circuit 1002. In addition, thermo-optic coupler 1020 enables operational adjustments to light distribution between MZI internal arms 1030*a-b* for optimal performance. For similar reasons, waveguide circuit 1002 also employs a thermo-optic coupler 1040 instead of an optical combiner similar to an optical combiner 440 used in waveguide circuit 402. Note that similar thermo-optic couplers can be used in waveguide circuit 402.

Each of MZI arms 1030*a-b* is coupled via a respective thermo-optic coupler 1034 to a respective optical resonator 1060. One purpose of coupling a separate optical resonator to each MZI arm is to reduce the amount of chirp in the output signal generated by waveguide circuit 1002 compared to that in the output signal generated by waveguide circuit 402. In a representative configuration, control signals 1006*a-b* drive phase shifters 1064*a-b*, respectively, in an opposite sense to achieve a push-pull type of operation, which results in an output signal having advantageously low chirp. Additional details on push-pull operation of Mach-Zehnder modulators can be found, e.g., in U.S. Patent Application Publication Nos. 2003/0175036 and 2004/0165893, both of which are incorporated herein by reference in their entirety. The physical mechanism of chirp reduction is explained in detail, e.g., in commonly owned U.S. patent application Ser. No. 11/684, 625 filed on Mar. 11, 2007 and entitled "Semiconductor Optical Modulator," which is also incorporated herein by reference in its entirety.

Figure 11:
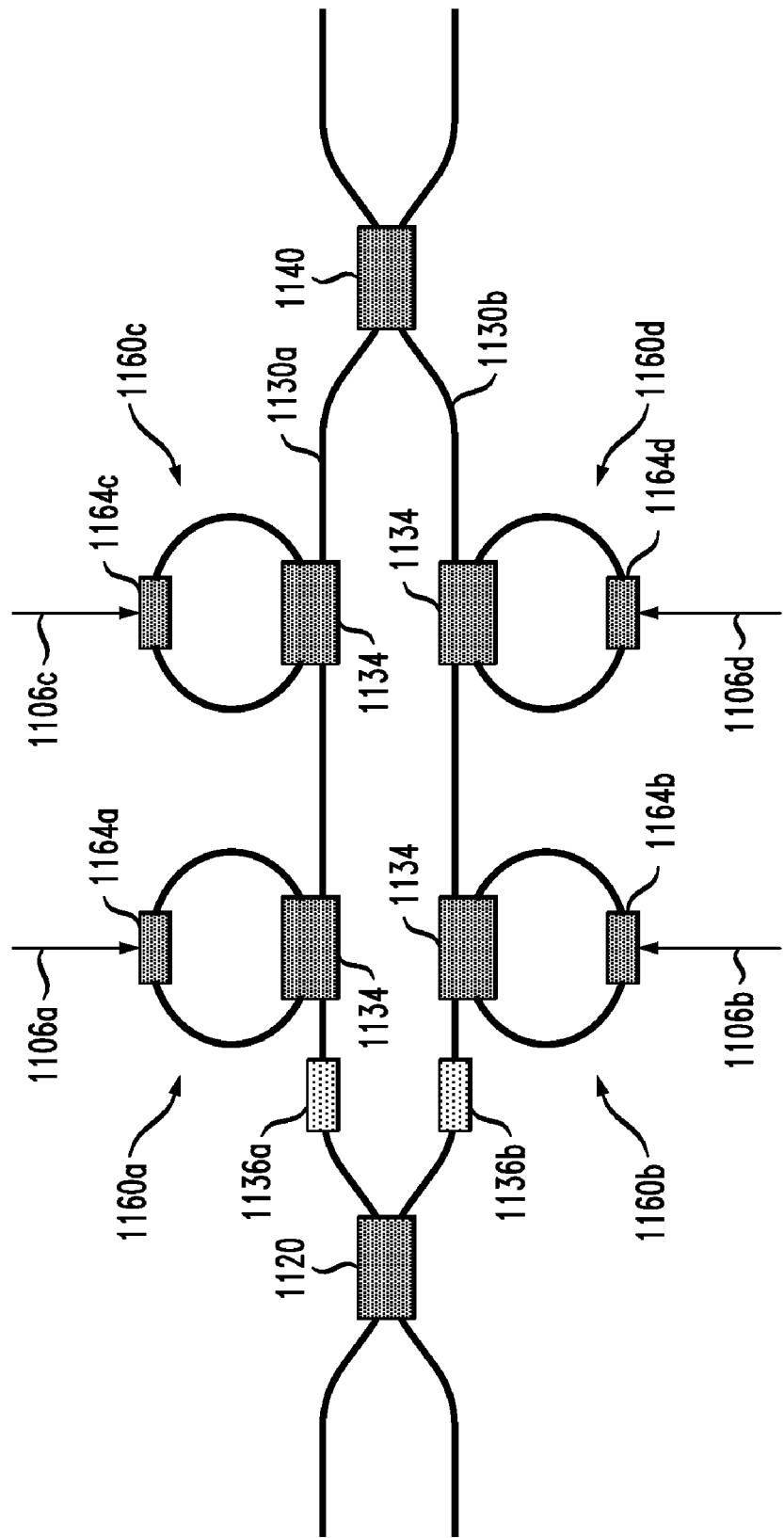
FIG. 11 shows a schematic diagram of a waveguide circuit that can be used in an optical modulator that is analogous to the optical modulator of FIG. 1 according to another embodiment of the invention.

FIG. 11 shows a schematic diagram of a waveguide circuit 1102 that can be used in an optical modulator that is analogous to optical modulator 100 according to another embodiment of the invention. Waveguide circuit 1102 is generally analogous to waveguide circuit 1002 (FIG. 10), and analogous elements of the two circuits are designated with labels having the same last two digits. However, one difference between waveguide circuits 1002 and 1102 is that each of MZI internal arms 1130*a-b* in the latter is coupled via two thermo-optic couplers 1134 to two respective optical resonators 1160. Using an additional optical resonator for each of MZI arms 1130*a-b* is beneficial, for example, when electro-optic phase shifters 1164 are implemented in a technology (e.g., carrier depleted Si-waveguide technology) that enables the refractive index to be tuned within a relatively narrow range. This relatively narrow range imposes a corresponding limit on the phase values accessible with each electro-optic phase shifter 1164. Concatenation of multiple resonators 1160 in each MZI arm 1130 effectively adds up the phase ranges of individual electro-optic phase shifters 1164, thereby advantageously broadening the accessible phase range. In addition, each of electro-optic phase shifters 1164 can be configured to operate relatively close to the minimum of a selected resonance of the corresponding resonator 1160, where its phase shifting ability (i.e., phase change per unit voltage change) is resonantly enhanced and has an advantageously large value. The latter can be used to reduce the driving voltage applied to each of phase shifters 1164. Furthermore, coupling multiple resonators 1160 to each MZI arm 1130 enables more flexibility in the control of the shape of the electro-optic response curve compared to that available with just one resonator being coupled to each MZI arm.

While this invention has been described with reference to illustrative embodiments, this description is not intended to be construed in a limiting sense. For example, a modulator of the invention can be implemented as an integrated circuit having both a waveguide circuit (e.g., one of circuits 402, 1002, and 1102) and a driver (e.g., driver 104). Each MZI arm in a waveguide circuit of the invention can be optically coupled to three or more optical resonators. For asymmetric bandwidth limiting (or inversion), adjacent resonances can be placed asymmetrically with respect to the optical carrier. Each or one of splitter 420 and combiner 440 can be replaced by tunable couplers, e.g., similar to coupler 434. Each or one of couplers 1020, 1120, 1040, and 1140 can be replaced by tunable waveguide splitters/combiners, e.g., similar to splitter 420 and combiner 440. Although embodiments of the invention have been described in reference to a configuration, in which a phase shifter (e.g., phase shifter 464) receives a data-modulated drive signal, waveguide circuits of the invention can also be configured so that an optical coupler (e.g., optical coupler 434) receives a data-modulated drive signal. The optical coupler may receive a data-modulated drive signal in addition to or instead of the phase shifter. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required.

What is claimed is:

1. An optical modulator, comprising:
   an optical Mach-Zehnder interferometer having first and second internal arms;
   a first optical resonator; and
   a first optical coupler adapted to optically couple the first optical resonator and the first internal arm, wherein:
   the optical modulator is adapted to modulate an optical carrier with data applied to a data input of the modulator; and
   the first optical resonator and the first optical coupler are tunable to change a radio-frequency response of the modulator to the data modulation to cause
   the optical modulator to exhibit an inverted radio-frequency response in a spectral range around an optical frequency of the optical carrier.

2. The invention of claim 1, wherein:
   optical loss induced in the first arm by the first optical resonator is characterized by a spectral resonance; and
   the first optical coupler is tunable to control a magnitude of said resonance.

3. The invention of claim 1, wherein the first optical resonator and the first optical coupler have been tuned to cause the modulator to exhibit a radio-frequency response characterized by a spectral attenuation gradient smaller than about 0.3 dB/GHz.

4. The invention of claim 1, wherein the first optical resonator comprises a tunable phase shifter adapted to define effective optical length of said optical resonator based on a received dc control voltage.

5. The invention of claim 4, wherein the phase shifter is further adapted to receive an electrical radio-frequency signal to produce the data modulation.

6. The invention of claim 4, wherein:
   the first optical resonator comprises a waveguide loop connected to the first optical coupler; and
   the phase shifter is part of said waveguide loop.

7. The invention of claim 4, wherein:
   optical loss induced in the first arm by the first optical resonator is characterized by one or more spectral resonances, each having a spectral position; and
   the tunable phase shifter is adapted to controllably change at least one of said spectral positions.

8. The invention of claim 1, further comprising a second optical resonator optically coupled to the second internal arm via a second optical coupler, wherein the second optical resonator and the second optical coupler are controllably tunable to further change the radio-frequency response.

9. The invention of claim 1, comprising a plurality of optical resonators, each optically coupled to a respective one of the first and second internal arms via a respective tunable optical coupler, wherein at least one of the first and second internal arms is optically coupled to at least two of said optical resonators.

10. The invention of claim 1, wherein the first optical resonator and the first optical coupler have been tuned to cause the modulator to exhibit said inverted radio-frequency response.

11. The invention of claim 1, wherein:
    the optical modulator is part of a communication system having one or more bandwidth-limiting components external to the optical modulator; and
    characteristics of said inverted response at least partially offset radio-frequency roll-off produced by said one or more bandwidth-limiting components.

12. The invention of claim 11, wherein:
    the optical modulator is located upstream from said one or more bandwidth-limiting components; and
    said inverted response at least partially pre-compensates the radio-frequency roll-off to mitigate its effects on signal reception at an optical receiver that is optically coupled to the modulator via said one or more bandwidth-limiting components.

13. The invention of claim 1, wherein at least one of the first and second arms comprises a respective tunable phase shifter adapted to configure the modulator for a selected modulation format.

14. The invention of claim 1, further comprising:
    a second tunable optical coupler adapted to couple light from one or more input waveguides into the first and second internal arms; and
    a third tunable optical coupler adapted to couple light from the first and second internal arms into one or more output waveguides, wherein the modulator is implemented as an integrated waveguide circuit.

15. A method of modulating light, comprising:
    applying an optical carrier to an optical Mach-Zehnder interferometer having first and second internal arms, wherein:
    the optical Mach-Zehnder interferometer is part of an optical modulator;
    the optical modulator further comprises an optical resonator and an optical coupler adapted to optically couple the optical resonator and the first internal arm;
    the optical resonator comprises a tunable phase shifter; and
    optical loss induced in the first arm by the optical resonator is characterized by one or more spectral resonances, each having a spectral position;
    modulating the optical carrier with data applied to a data input of the modulator, wherein the data modulation causes said spectral positions to vary in time; and
    tuning the optical resonator and the optical coupler to change radio-frequency response of the modulator to the data modulation, wherein said tuning causes:
    a time-averaged spectral resonance to be substantially at an optical frequency of the optical carrier; or
    an optical frequency of the optical carrier to be spectrally located substantially equidistantly between two adjacent time-averaged spectral resonances.

16. The invention of claim 15, wherein:
    said tuning causes the time-averaged spectral resonance to be substantially at the optical frequency of the optical carrier.

17. The invention of claim 15, wherein:
    said tuning causes the optical frequency of the optical carrier is to be spectrally located substantially equidistantly between said two adjacent time-averaged spectral resonances.

18. A method of modulating light, comprising:

applying an optical carrier to an optical Mach-Zehnder interferometer having first and second internal arms, wherein:

the optical Mach-Zehnder interferometer is part of an optical modulator; and the optical modulator further comprises an optical resonator and an optical coupler adapted to optically couple the optical resonator and the first internal arm;

modulating the optical carrier with data applied to a data input of the modulator; and tuning the optical resonator and the optical coupler to cause the optical modulator to exhibit an inverted radio-frequency response in a spectral range around an optical frequency of the optical carrier.

19. The invention of claim 18, wherein:

the optical modulator is part of a communication system having one or more bandwidth-limiting components external to the optical modulator; and the method further comprises selecting characteristics of said inverted radio-frequency response to at least partially offset radio-frequency roll-off produced by said one or more bandwidth-limiting components.

20. The invention of claim 19, wherein:

the optical modulator is located upstream from said one or more bandwidth-limiting components; and said inverted radio-frequency response at least partially pre-compensates the radio-frequency roll-off to mitigate its effects on signal reception at an optical receiver that is optically coupled to the modulator via said one or more bandwidth-limiting components.

* * * * *

UNITED STATES PATENT AND TRADEMARK OFFICE
CERTIFICATE OF CORRECTION

| | | |
|---|---|---|
| PATENT NO. | : 7,805,026 B2 | Page 1 of 1 |
| APPLICATION NO. | : 12/168976 | |
| DATED | : September 28, 2010 | |
| INVENTOR(S) | : Douglas M. Gill | |

It is certified that error appears in the above-identified patent and that said Letters Patent is hereby corrected as shown below:

- In Column 5, Line 25, please replace ",where $\varepsilon$ is the coupling coefficient of the coupler," with -- where $\kappa$ is the coupling coefficient of the coupler, --.

Signed and Sealed this
Tenth Day of January, 2012

David J. Kappos
*Director of the United States Patent and Trademark Office*